(12) United States Patent
Pu (10) Patent No.: US 9,985,558 B2
(45) Date of Patent: May 29, 2018

(54) ELECTRICAL SERIALLY-CONNECTED CONTROL SYSTEM

(71) Applicant: NATIONAL CHIN-YI UNIVERSITY OF TECHNOLOGY, Taichung (TW)

(72) Inventor: Wen-Cheng Pu, Taichung (TW)

(73) Assignee: National Chin-Yi University of Technology, Taichung (TW)

(*) Notice: Subject to any disclaimer, the term of this patent is extended or adjusted under 35 U.S.C. 154(b) by 0 days. days.

(21) Appl. No.: 15/627,554

(22) Filed: Jun. 20, 2017

(65) Prior Publication Data

US 2018/0006586 A1    Jan. 4, 2018

(30) Foreign Application Priority Data

Jun. 29, 2016   (TW) .............................. 105120483 A (51) Int. Cl.
*H02P 1/54*     (2006.01)
*H02P 5/00*     (2016.01)
*H02P 5/46*     (2006.01)
*H02P 5/60*     (2006.01)

(52) U.S. Cl.
CPC ..................................... *H02P 5/60* (2013.01)

(58) Field of Classification Search
CPC ........................................................ H02P 5/60
USPC ......................................................... 318/113
See application file for complete search history.

(56) References Cited

U.S. PATENT DOCUMENTS

2013/0093390 A1   4/2013  Partovi
2015/0035378 A1   2/2015  Calhoun et al.

FOREIGN PATENT DOCUMENTS

| TW | M344678   | U | 11/2008 |
| TW | 201008106 | A | 2/2010  |
| TW | 201409900 | A | 3/2014  |
| TW | 201541783 | A | 11/2015 |

*Primary Examiner* — Erick Glass
(74) *Attorney, Agent, or Firm* — Rosenberg, Klein & Lee (57) ABSTRACT

An electrical serially-connected control system for driving motors in series includes a control device, at least one processing device, and a transmission medium connected between the two devices for mutual communication. The control device includes a power rectifier transforming an external power, a signal converter converting each external command signal, and an integration unit connected to the rectifier and the converter for integrating the transformed power with each converted command signal to create commands. The processing device includes a voltage regulator connected to the transmission medium for stabilizing the power come from the command, a power storage module connected to the voltage regulator and each motor, a signal filter connected to the transmission medium for processing the command signal come from the command, a controller connected with the voltage regulator, the power storage module and the signal filter, and a signal generator connected to the controller.

5 Claims, 6 Drawing Sheets

ELECTRICAL SERIALLY-CONNECTED CONTROL SYSTEM

BACKGROUND OF THE INVENTION

1. Field of the Invention

This invention relates to a control system and relates particularly to an electrical serially-connected control system.

2. Description of the Related Art

A motor is one of the essential parts in not only industrial field but also scientific field. Of all the motors used by man can be divided into DC motors and AC motors. Generally, an operation of a single motor is executed through a controller and a control line. The corresponding control lines should be added to each motor for transmitting power and command signals if the user attempts to operate several motors simultaneously. However, the additional control lines complicate the whole circuit. Meanwhile, during the operation of activating each motor, each motor may operate unsuccessfully or even get damaged if the control lines are arranged improperly or mistaken in placement. Hence, the motors are managed ineffectively. Besides, the cost of setup is increased greatly. Further, the more the user add the motors, the greater the interference during the transmission of the command signals is. Thus, the control difficulty of the motors is increased. In view of this, the applicant advances an electrical serially-connected control system aiming at improving aforementioned deficiencies.

SUMMARY OF THE INVENTION

The object of this invention is to provide an electrical serially-connected control system capable of transforming received power, converting each received command signal, integrating the transformed power with each converted command signal to create commands and activating motors respectively through a transmission medium.

The electrical serially-connected control system of this invention applied to control and drive a plurality of motors in series includes a control device, at least one processing device positioned on each motor, and a transmission medium connected therebetween. The control device has a power rectifier transforming an external power, a signal converter converting an external command signal, and an integration unit connected to the power rectifier and the signal converter respectively for combining the transformed power with each converted command signal to generate commands which are transmitted through the transmission medium. The processing device retrieving the command and dividing the command into the power and the command signal has a voltage regulator connected to the transmission medium for regulating the power, a power storage module connected to the voltage regulator and each motor for storing the regulated power, a signal filter connected to the transmission medium for removing noise from the command signal and restoring the command signal, a controller connected with the voltage regulator, the power storage module and the signal filter, and a signal generator connected to the controller. The controller instructs the power storage module to send out the power and simultaneously activates the motor based on the restored command signal. Further, the signal generator converts working states of the voltage regulator, the power storage module and the signal filter that are collected by the controller into a reporting signal and transmits the reporting signal through the transmission medium to the control device to achieve the mutual communication. Hence, the motors are respectively controlled through the transmission medium. Whereby the electrical serially-connected control system is universally adapted to control and drive several motors. The operation of controlling and driving the motors is simplified. The convenience of the drive and control operation is increased.

Preferably, the power storage module is a cell.

Preferably, the power storage module is a capacitor.

Preferably, the processing device is fitted on each motor.

Preferably, the integration unit transforms a direct current into an alternating current and combines the alternating current with the command signal from the signal converter.

DETAILED DESCRIPTION OF THE PREFERRED EMBODIMENTS

Figure 1:
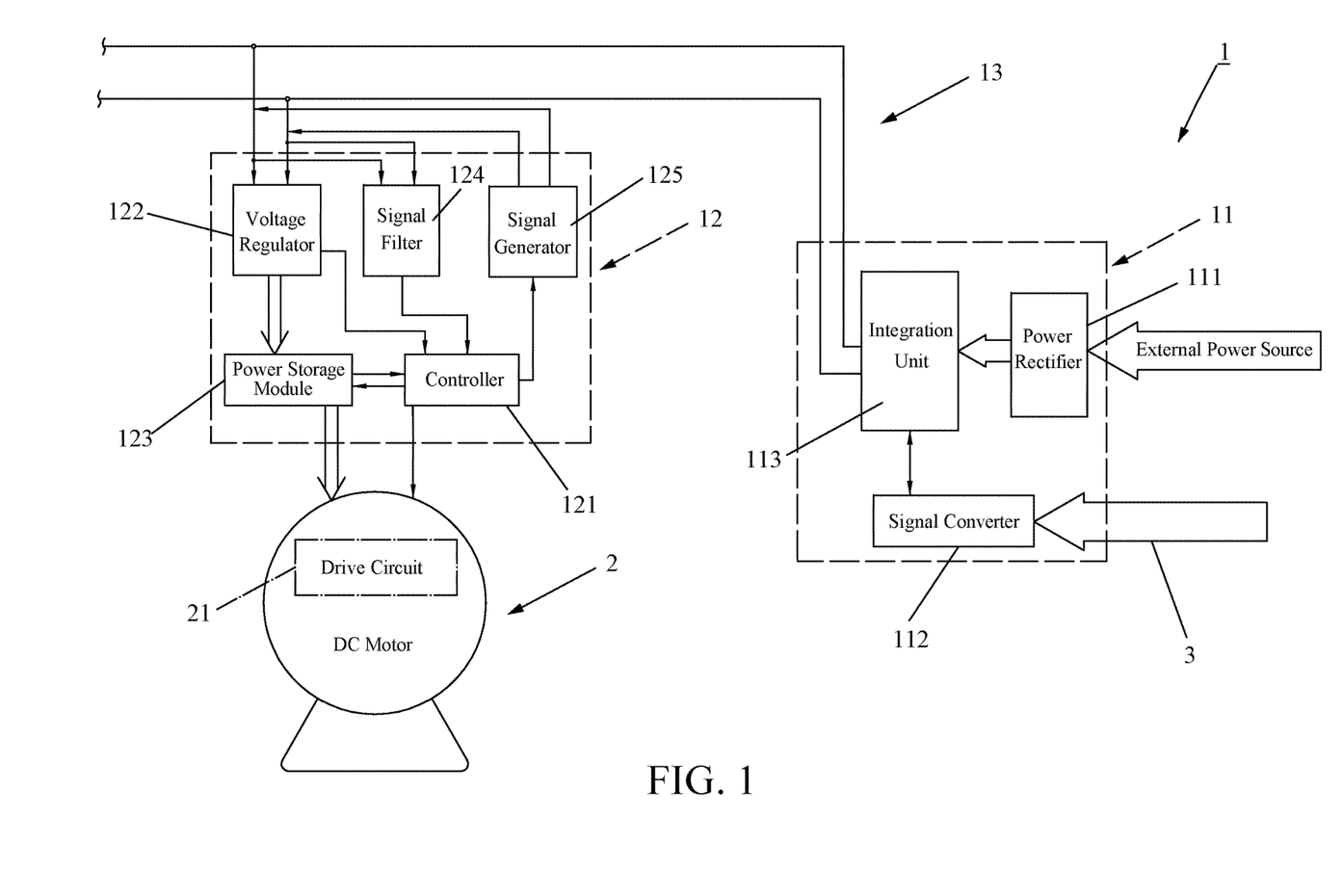
FIG. 1 is a schematic view showing a first preferred embodiment of this invention.

Referring to FIG. 1, a first preferred embodiment of an electrical serially-connected control system 1 of this invention is applied to control and drive a plurality of DC motors 2 which are organized in series in this preferred embodiment. The electrical serially-connected control system 1 includes a control device 11 connected to an external power source and an external communication interface 3, at least one processing device 12 applied to control an operation of the DC motors 2, and a transmission medium 13 connected to the control device 11 and the processing device 12 respectively.

The control device 11 has a power rectifier 111 connected to the external power source, a signal converter 112 connected the external communication interface 3, and an integration unit 113 connected to the power rectifier 111 and the signal converter 112 respectively. The power rectifier 111 transforms power received from the external power source, in other words, the power rectifier 111 transforms an alternating current into a direct current when the power of the external power source is an alternating current. If the power of the external power source is a direct current, the power rectifier 111 will not execute the transformation. The transformed power is further forwarded to the integration unit 113. Meanwhile, when the signal converter 112 receives at least one external command signal from the external communication interface 3, the signal converter 112 converts the external command signal into the deliverable command signal. The deliverable command signal is further forwarded to the integration unit 113. The signal converter 112 is also capable of converting the reporting signal come from the integration unit 113 into a feedback and delivering the feedback to the external communication interface 3. Hence, a mutual communication between the processing device 12 and the external communication interface 3 is provided. Further, the integration unit 113 combines the transformed power come from the power rectifier 111 with the converted command signal come from the signal converter 112 to create at least one command. The command is delivered to the processing device 12 via the transmission medium 13.

The processing device 12 has a voltage regulator 122 connected to the transmission medium 13, a power storage module 123 connected to the voltage regulator 122 and each DC motor 2, a signal filter 124 connected to the transmission medium 13, a controller 121 connected with the voltage regulator 122, the power storage module 123 and the signal filter 124 respectively, and a signal generator 125 connected to the controller 121. The processing device 12 retrieves the command from the transmission medium 13 and divides the command into the power and the command signal. The voltage regulator 122 regulates the power to be stable and transmits the regulated power to the power storage module 123 for storing. The power storage module 123 continues receiving the regulated power until the controller 121 instructs the power storage module 123 to send out the stored power to the DC motor 2. The power storage module 123 can be either a cell or a capacitor according to the user's requirement. Moreover, the signal filter 124 removes noise of the command signal and restore the command signal. The controller 121 then receives and analyzes the restored command signal in order determine whether the DC motor 2 should be activated according to the restored command signal. When the controller 121 confirms that the command signal is for activating the specific DC motor 2 where the controller 121 is fitted, the controller 121 further instructs the power storage module 123 to send out the power to a drive circuit 21 of the DC motor 2 and simultaneously activates the DC motor 2. Hence, the DC motor 2 starts operating after receiving the power and the instruction of the controller 121. Moreover, the controller 121 is able to collect working states of the voltage regulator 122, the power storage module 123, and the signal filter 124. The collected working states are then delivered from the controller 121 to the signal generator 125 for converting the collected working states into the reporting signal. The reporting signal is then delivered from the signal generator 125 to the control device 11 through the transmission medium 13 for allowing the control device 11 to communicate with the external communication interface 3.

The transmission medium 13 is a signal line connected between the control device 11 and the processing device 12. The transmission medium 13 transmits any commands from the control device 11 to the processing device 12 and also returns any reporting signals from the processing device 12 to the control device 11, thereby achieving the mutual communication between the control device 11 and the processing device 12 certainly.

Figure 2:
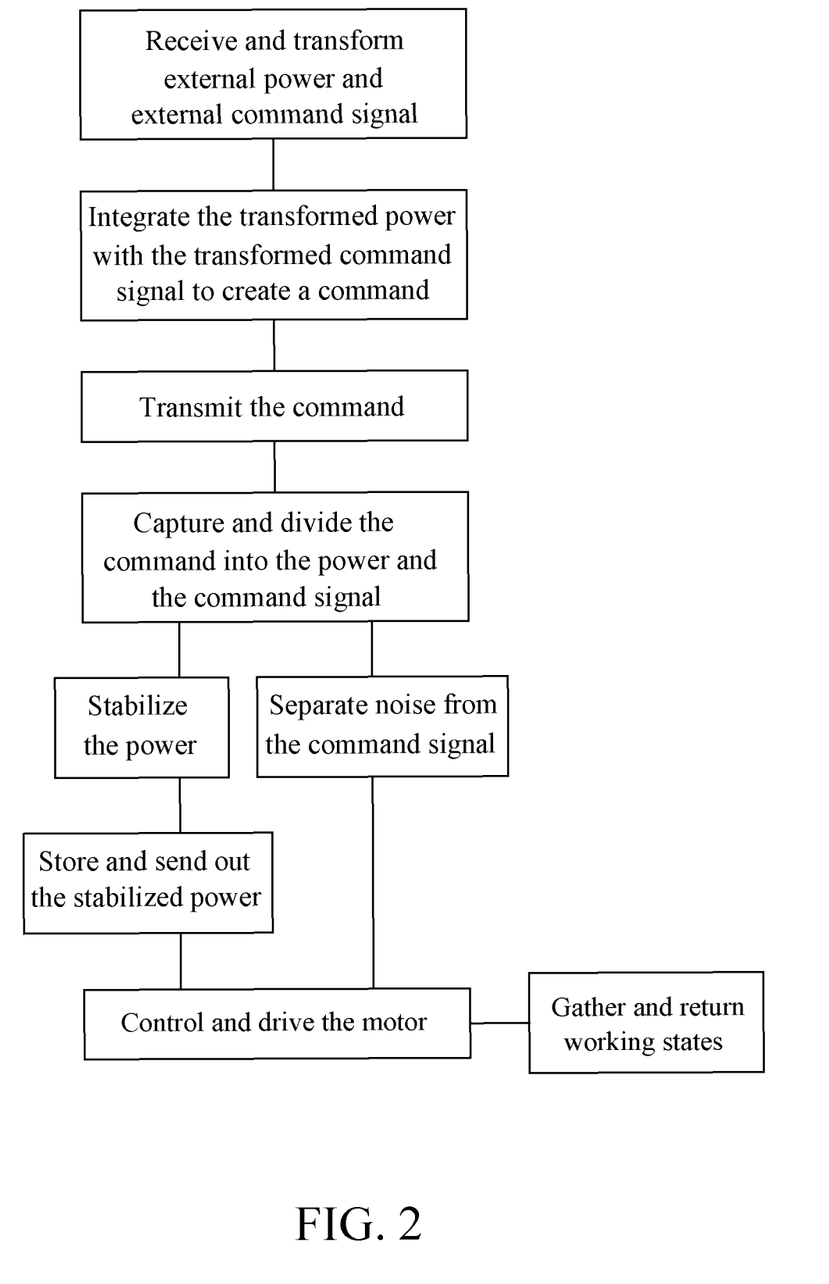
FIG. 2 is a block diagram showing the steps of the first preferred embodiment of this invention.
Figure 3:
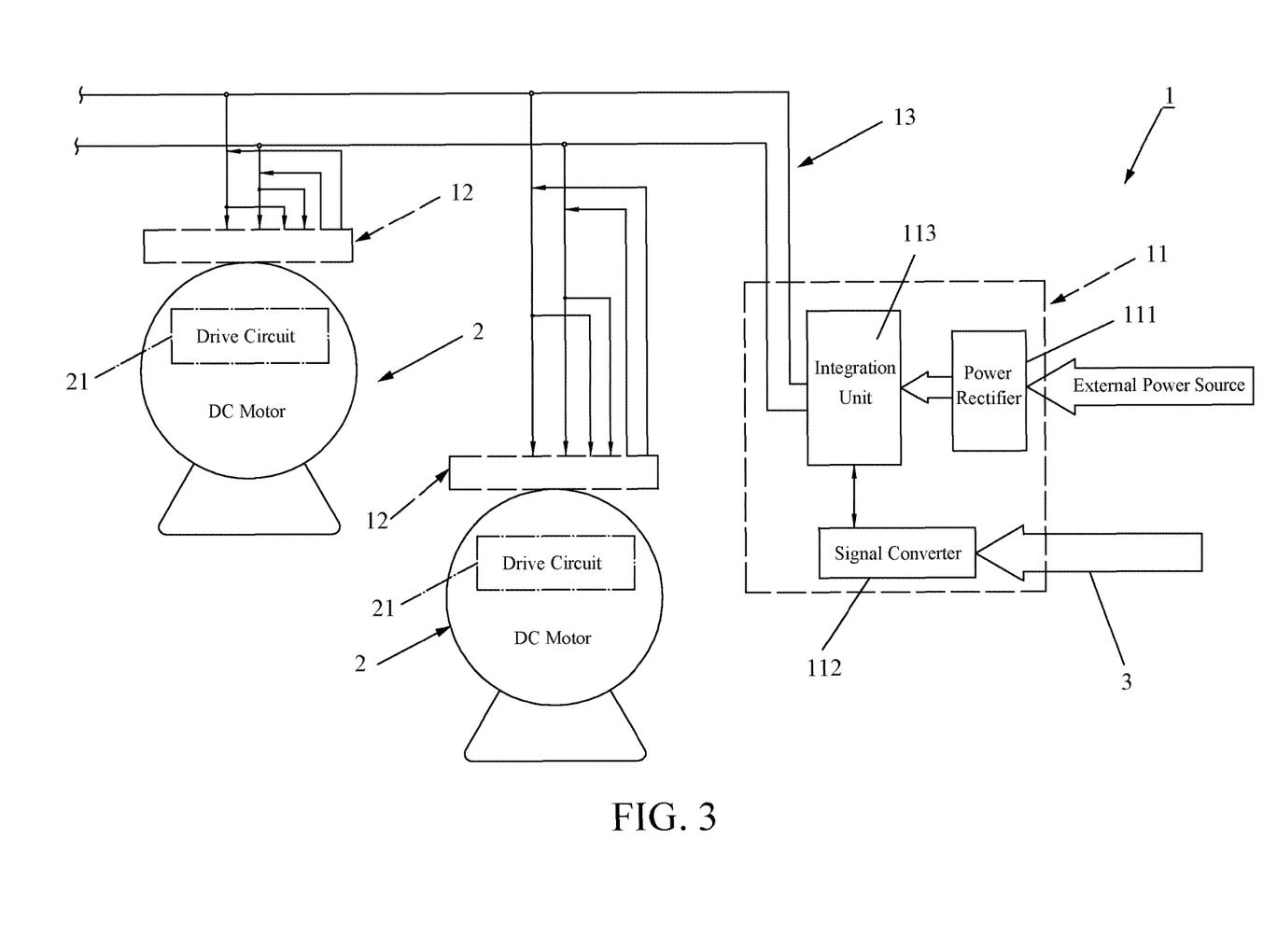
FIG. 3 is a schematic view showing how the electrical serially-connected control system drives a plurality of DC motors arranged in series.

Referring to FIG. 1 to FIG. 3, in view of the independent design of each DC motor 2, the amount of the processing device 12 is prepared according to the total amount of the DC motors 2, in other words, each DC motor 2 is equipped with one processing device 12. The processing device 12 is connected to the drive circuit 21 of each DC motor 2. Further, the receiving condition of the processing device 12 of each DC motor 2 is set with the signal converter 112 of the control device 11. Hence, when the signal converter 112 of the control device 11 receives a plurality of external command signals from the external communication interface 3, the signal converter 112 converts each external command signal into the deliverable command signal and delivers all converted command signals to the integration unit 113. Simultaneously, the power rectifier 111 transforms the power of the external power source and delivers the transformed power to the integration unit 113. The integration unit 113 further integrates the transformed power with each converted command signal into the command. All commands are then delivered through the transmission medium 13. During the transmission of the commands within the transmission medium 13, each processing device 12 connected to the transmission medium 13 captures the matching command and divides the command into the power and the command signal. The power is stabilized by the voltage regulator 122 and stored into the power storage module 123. The command signal is processed by the signal filter 124 in order to separate the noise from the command signal and restore the command signal. The restored command signal is then delivered to the controller 121. The controller 121 further instructs the power storage module 123 to send out the power to the drive circuit 21 of the DC motor 2 and activates the DC motor 2 after receiving the restored command signal. When the DC motor 2 starts operating, the processing device 12 executes the working states gathering of the voltage regulator 122, the power storage module 123 and the signal filter 124. The gathered working states are further converted into the reporting signal by the signal generator 125. The reporting signal is then delivered to the integration unit 113 of the control device 11 through the transmission medium 13. The reporting signal is further delivered from the integration unit 113 to the signal converter 112. The signal converter 112 converts the reporting signal into the feedback which is recognizable by the external communication interface 3 and delivers the feedback to the external communication interface 3. Whereby a mutual communication between the control device 11 and the external communication interface 3 is attained. Therefore, the user can control and monitor the DC motors 2 through the external communication interface 3. Thus, the electrical serially-connected control system 1 is able to integrate the power with each command signal into the command and deliver all commands via the transmission medium 13 respectively to complete activating each DC motor 2. Whereby the electrical serially-connected control system 1 can be universally adapted to control and drive various motors. The operation of driving and controlling is facilitated. The convenient drive and control operation is achieved.

Figure 4:
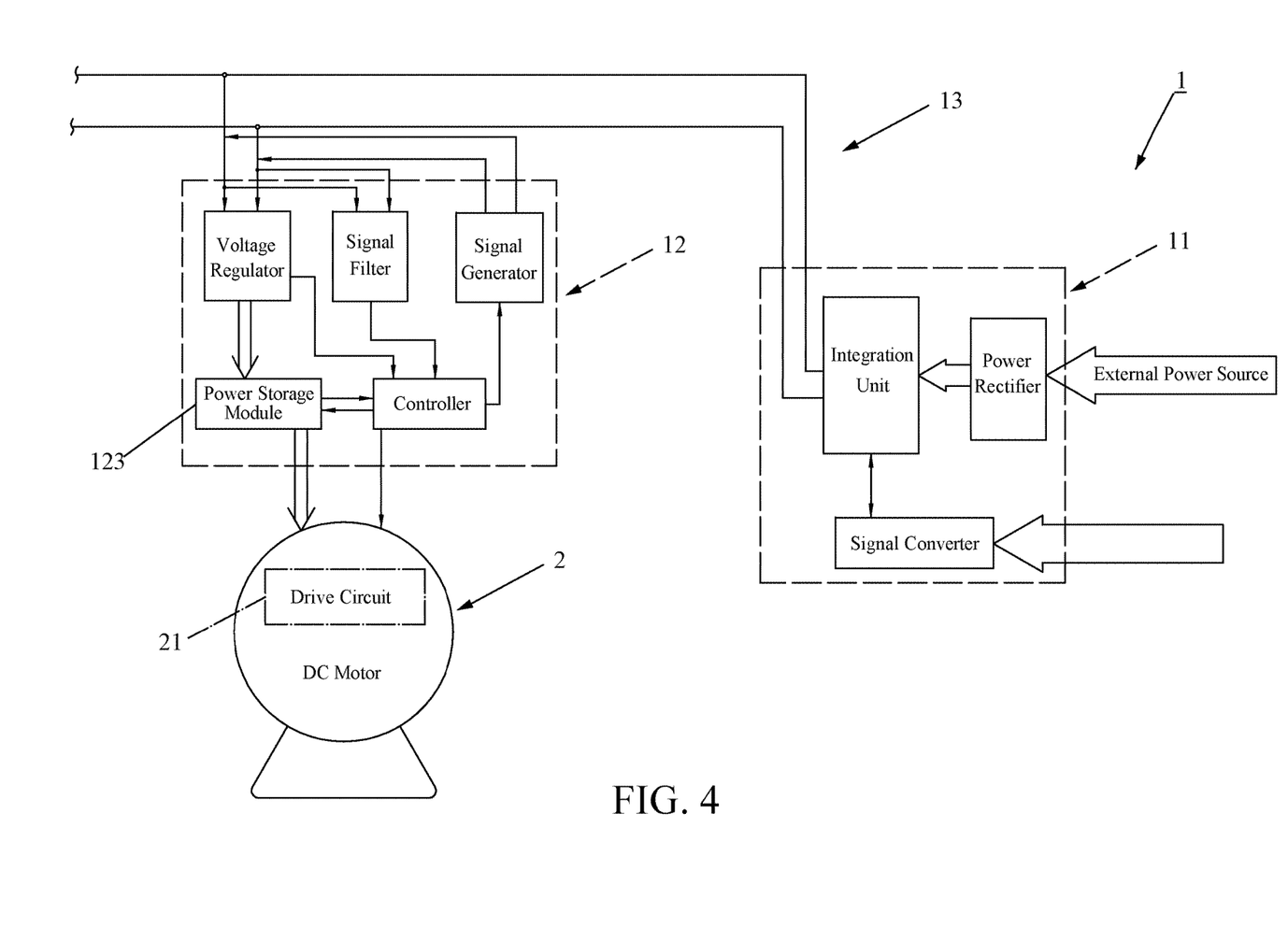
FIG. 4 is a schematic view showing a second preferred embodiment of this invention.
Figure 5:
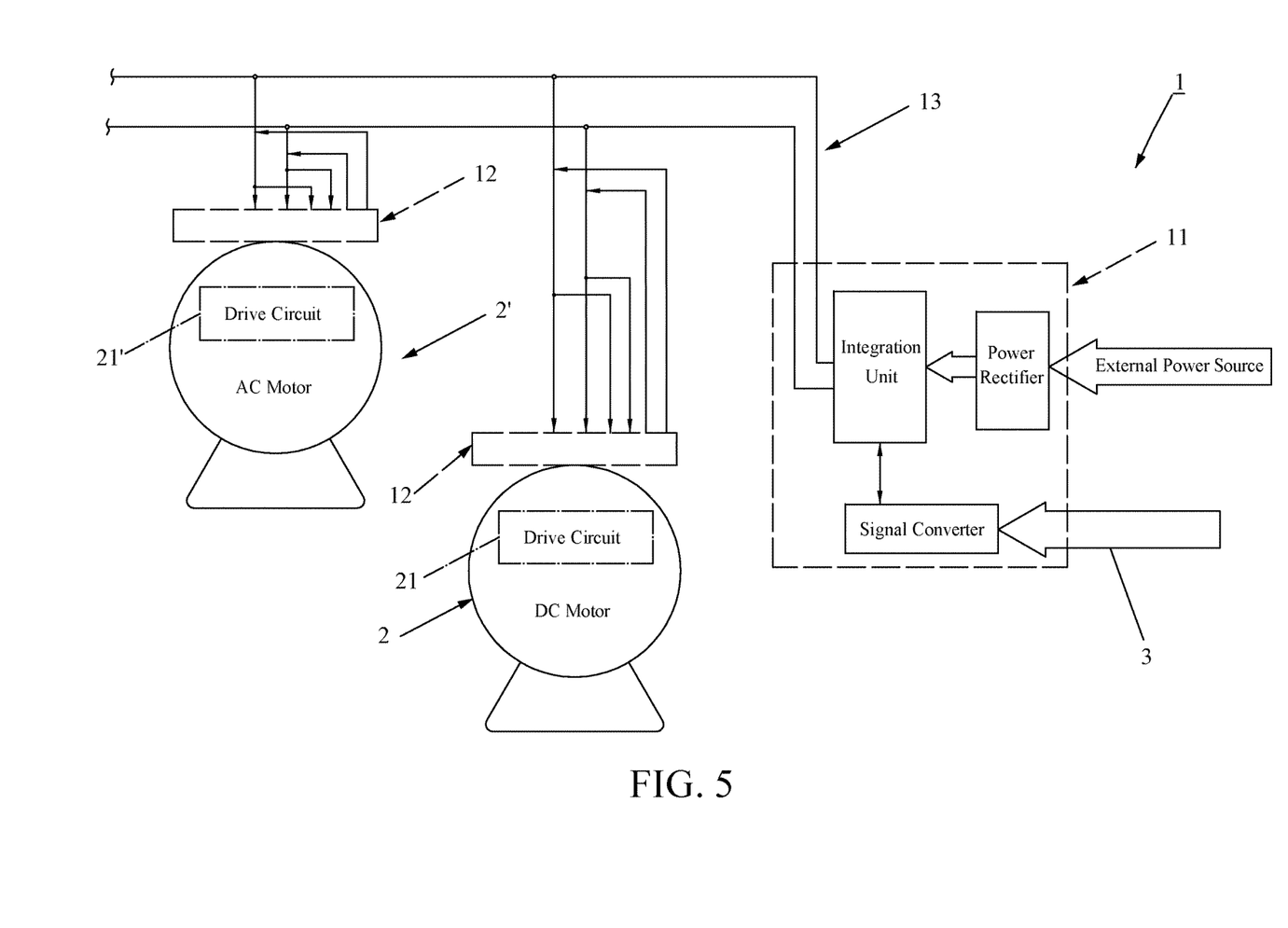
FIG. 5 is a schematic view showing how the electrical serially-connected control system drives DC and AC motors arranged in series simultaneously.

Referring to FIG. 4 and FIG. 5 show a second preferred embodiment of the electrical serially-connected control system 1 of this invention. The elements of the second preferred embodiment are the same as those of the first preferred embodiment. This embodiment is characterized in that the electrical serially-connected control system 1 is applied to control and drive a plurality of DC and AC motors 2-2' simultaneously. When the electrical serially-connected control system 1 executes the operation of the DC motor 2 and the AC motor 2', the control device 11 transforms the external power, converts each external command signal into the deliverable command signal, and combines the transformed power with each command signal to create the command. All commands are then delivered via the transmission medium 13. Further, each processing device 12 captures the matching command and divides the command into the power and the command signal. The power is stabilized and the command signal is processed to separate the noise from the command signal and restore the command signal. Because the power delivered through the transmission medium 13 is the direct current, the DC motor 2 can receive the power directly for operating. When the drive circuit 21' of the AC motor 2' receives the power, the drive circuit 21' transforms the power sent by the power storage module 123 into the alternating current in order to activate the AC motor 2'. Meanwhile, the processing devices 12 gathers the working states, converts the gathered working states into the reporting signal, and delivers the reporting signal to the control device 11 via the transmission medium 13. The control device 11 further converts the reporting signal into the feedback and delivers the feedback to the external communication interface 3, thereby achieving the communication with the user. Thus, the drive and control operation of each motor 2-2' is completed with the transmission medium 13. Whereby the simple operation of driving and controlling is attained and the electrical serially-connected control system 1 is universally applied to control and drive different motors.

Figure 6:
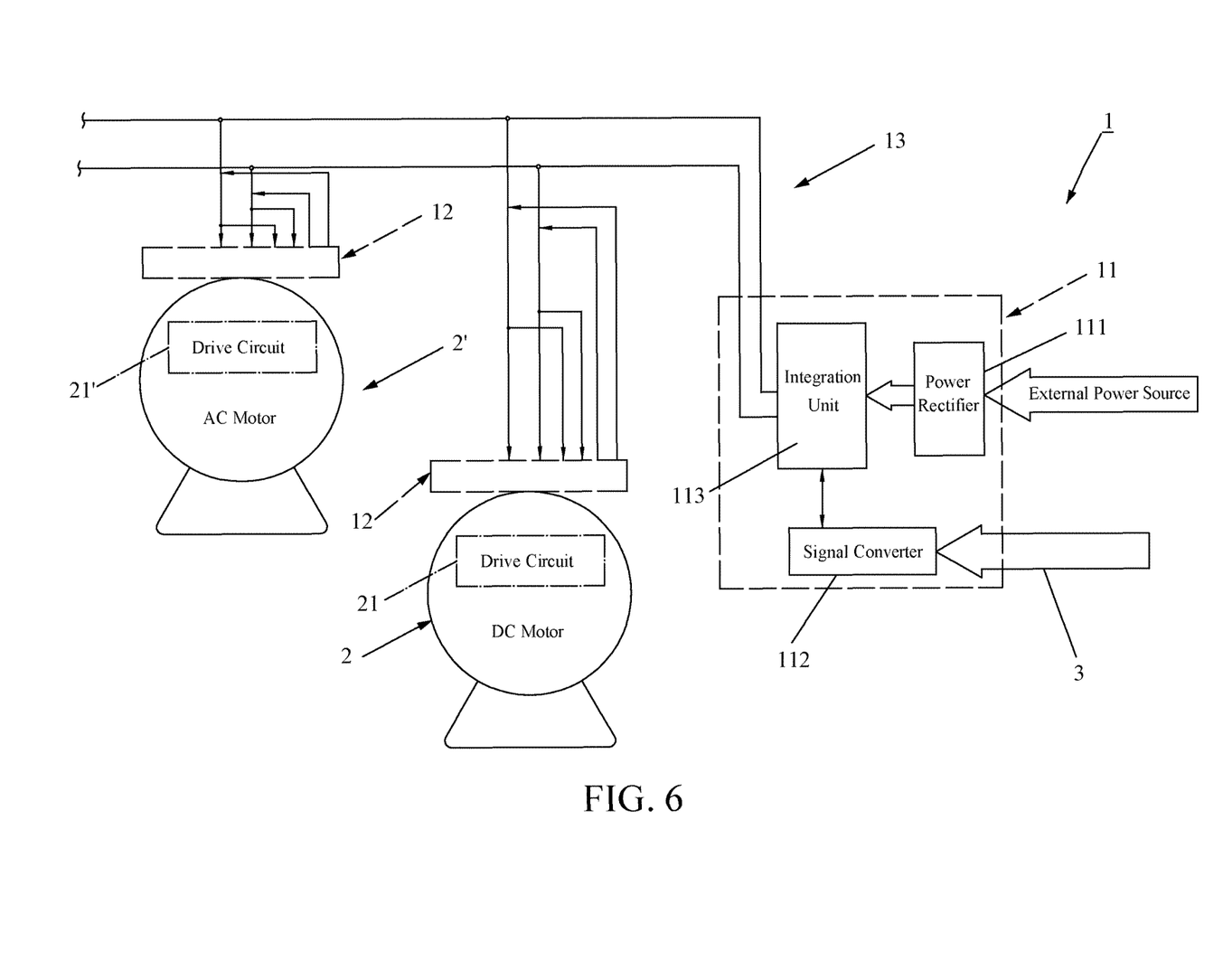
FIG. 6 is a schematic view showing a third preferred embodiment of this invention.

Referring to FIG. 6 shows a third preferred embodiment of the electrical serially-connected control system 1 of this invention. The elements of the third preferred embodiment are the same as those of the first and second preferred embodiments. This embodiment is characterized in that the integration unit 113 of the control device 11 is capable of transforming the direct current into the alternating current in order to achieve the requirement of integrating the alternating current with the command signal come from the signal converter 112. When the control device 11 receives an instruction of integrating the power respectively with the direct current and the alternating current, the power rectifier 111 transforms the power of the external power source into the direct current and the signal converter 112 converts each command signal into deliverable. All converted command signals and the power are delivered to the integration unit 113 for integration. The integration unit 113 integrates the power come from the power rectifier 111 with the command signal which is for activating the DC motor 2 into the DC command first. The integration unit 113 further transforms part of the power of the power rectifier 111 into the alternating current and integrates the alternating current with the command signal which is for activating the AC motor 2' into the AC command. The DC and AC commands are further delivered through the transmission medium 13. Thus, the processing device 12 fitted on the AC motor 2' captures the AC command and divides the AC command into the power and the command signal. The power is then steadied and transformed into the direct current for storing. When the AC motor 2' receives the power sending out from the processing device 12, the drive circuit 21' transforms the power into the alternating current in order to operate the AC motor 2'. On the other hand, the processing device 12 fitted on the DC motor 2 captures the DC command and divides the DC command into the power and the command signal. The power is then regulated for storing and activating the DC motor 2. Surely, each processing device 12 is able to convert the working states into the reporting signal and deliver the reporting signal via the transmission medium 13. Thus, the integration unit 113 is able to execute the integration of different power with the command signals according to needs. Whereby the operation of driving and controlling is simplified effectively and the electrical serially-connected control system 1 is universally adapted to control and drive various motors.

To sum up, the electrical serially-connected control system of this invention takes advantages of the control device, the processing device, and the transmission medium to drive and control the motors effectively. The control device transforms the external power, convert each external command signal and integrate the transformed power with each converted command signal to create the commands which are transmitted through the transmission medium in order to activate the motors respectively. Further, the processing device is able to collect and return the working states of each motor. Whereby the operation of driving and controlling the motors is facilitated and the electrical serially-connected control system is universally applied to control and drive several different motors.

While the embodiments of this invention are shown and described, it is understood that further variations and modifications may be made without departing from the scope of this invention.

What is claimed is:

1. An electrical serially-connected control system adapted to control and drive a plurality of motors connected in series, said electrical serially-connected control system comprising a control device connected to an external power source and an external communication interface, at least one processing device used to control an operation of said motors, and a transmission medium connected to said control device and said processing device respectively, wherein said transmission medium receives and transmits any command from said control device to said processing device, said transmission medium also receiving and transmitting any reporting signals from said processing device to said control device, thereby creating a mutual communication between said control device and said processing device for serially-connected control:

wherein said control device includes a power rectifier connected to said external power source and transforming power of said external power source, a signal converter connected to said external communication interface and capable of receiving, transmitting and converting at least one external command signal into at least one deliverable command signal, and an integration unit respectively connected to said power rectifier and said signal converter for integrating said transformed power of said power rectifier with said at least one converted command signal of said signal converter to create at least one command, said integration unit being able to return a reporting signal to said signal converter, said signal converter being capable of transforming said reporting signal into a feedback for communicating with said external communication interface; and wherein said processing device includes a voltage regulator connected to said transmission medium and capable of capturing and stabilizing said power from said command integrated by said integration unit, a power storage module connected to said voltage regulator and each of said motors for storing and delivering said stabilized power, a signal filter connected to said transmission medium and capable of capturing said command signal from said command integrated by said integration unit, separating noise from said captured command signal and restoring said command signal, a controller connected with said voltage regulator, said power storage module, and said signal filter respectively, and a signal generator connected to said controller, said controller receiving said restored command signal from said signal filter and instructing said power storage module to send out said power and concurrently activate each of said motors, said controller gathering working states of said voltage regulator, said power storage module and said signal filter and transmitting said gathered working states to said signal generator, said signal generator converting said gathered working states into said reporting signal and transmitting said reporting signal to said control device via said transmission medium for allowing said control device to communicate with said external communication interface.

2. The electrical serially-connected control system as claimed in claim 1, wherein said power storage module is a cell.

3. The electrical serially-connected control system as claimed in claim 1, wherein said power storage module is a capacitor.

4. The electrical serially-connected control system as claimed in claim 1, wherein said processing device is disposed on each of said motors.

5. The electrical serially-connected control system as claimed in claim 1, wherein said integration unit transforms a direct current into an alternating current and integrates said alternating current with said command signal come from said signal converter.

* * * * *